Jan. 5, 1954          B. JONES          2,664,749
FLUID PRESSURE RESPONSIVE EQUIPMENT
Filed Jan. 10, 1948                                 2 Sheets-Sheet 1
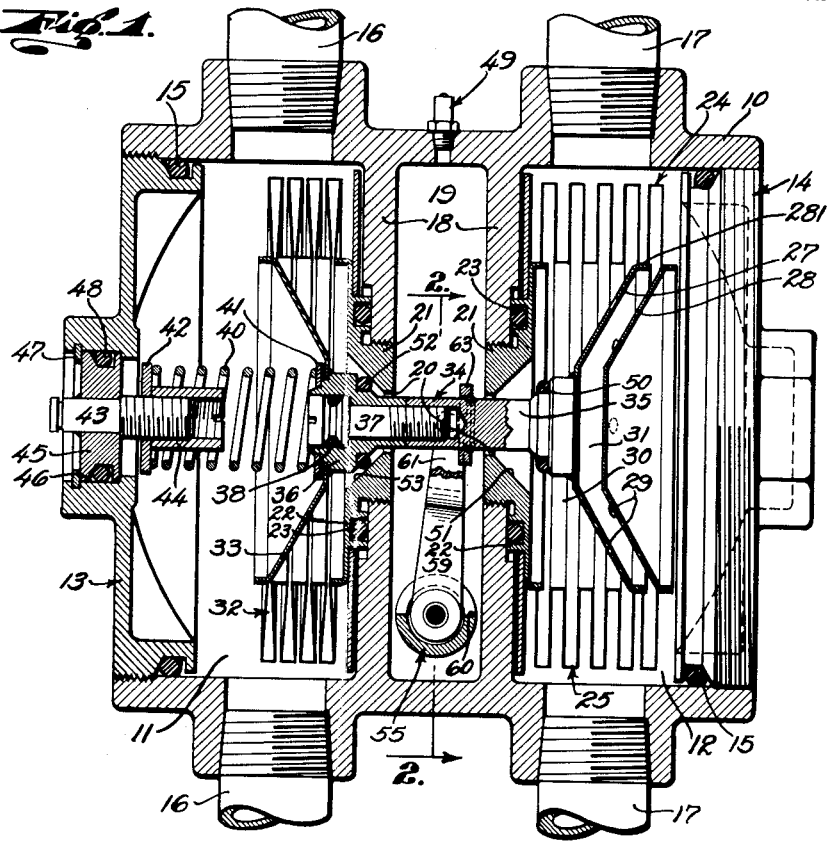
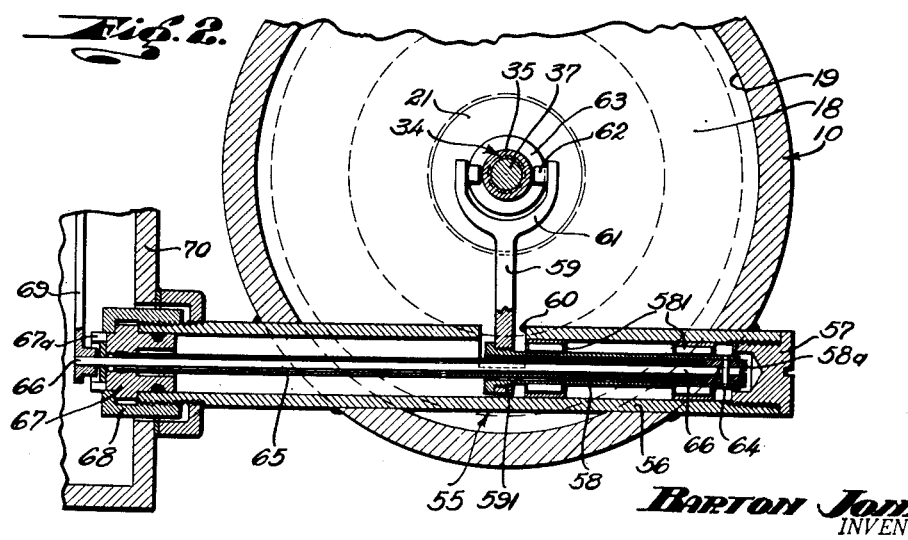
BARTON JONES
INVENTOR.
BY H. Calvin White
ATTORNEY Jan. 5, 1954

B. JONES 2,664,749

FLUID PRESSURE RESPONSIVE EQUIPMENT

Filed Jan. 10, 1948

BARTON JONES
INVENTOR.

BY *[signature]*

ATTORNEY

Patented Jan. 5, 1954

2,664,749

UNITED STATES PATENT OFFICE 2,664,749

FLUID PRESSURE RESPONSIVE EQUIPMENT

Barton Jones, Los Angeles, Calif.

Application January 10, 1948, Serial No. 1,597

4 Claims. (Cl. 73—407)

1

This invention has to do with improvements in fluid pressure responsive apparatus of the type disclosed in Patent No. 2,400,048, issued May 7, 1946, to me on Differential Pressure Responsive Device, and my copending application Serial No. 528,409, filed March 28, 1944, now Patent No. 2,590,324, on Temperature Compensating Means for Measuring Differential Pressures.

Apparatus of the present type may be characterized as comprising a housing containing a pair of interconnected pressure responsive elements, subjected to differential pressures communicated to separate spaces in the housing and connected to or so associated with an appropriate pick-up device that energy or movement in accordance with the displacements of the pressure responsive elements is transmitted to the outside of the housing for any of such various purposes as effecting movements, indications or controls in accordance with variations in the said differential pressures. More specifically, the invention relates to improvements in that type of structure employing pressure responsive elements which, generally considered, have diaphragm characteristics, though preferably are in the form of cup-shaped bellows having their closed ends associated for simultaneous movement by an interconnection extended within a chamber between the bellows.

The invention has for its major object to provide for a novel and highly practicable accommodation of the bellows movement "pick-up" device in a closed chamber between the bellows, and for transmission of movement or energy by means of such device to the exterior of the housing while maintaining the chamber in sealed condition.

Particularly contemplated is the maintenance of the "pick-up" device not only in sealed condition within the chamber, but also in contact with a liquid filling the chamber and serving to protect the device against corrosion, wear or other adverse effect which might exist in the absence of the protective effect of the liquid or sealed condition of the chamber.

As will appear, the invention broadly contemplates the use of any suitable pick-up means located as indicated and capable of transmitting movement or energy in accordance with the bellows displacement. Preferably, depending upon particular purposes and installations, I employ one of two general types: (1) A mechanical device, desirably employing a torsion element or tube, for transmitting bellows-created movement to the outside of the housing, or (2) an appropriate electrical device capable of transmitting or modulating electrical energy in accordance with the bellows movement.

2

In its practical adaptation the invention embodies various additional features such as preferred structures and arrangements for accomplishing the above-mentioned functions, and provision for replacing from the outside of the housing the inter-bellows chamber air with liquid filling the chamber as well as the bellows themselves. All objects and details of certain illustrative embodiments of the invention will be understood to better advantage from the following description of the accompanying drawings, in which:

Fig. 1 is a view showing one form of the invention in axial section;

Fig. 2 is a fragmentary cross section on line 2—2 of Fig. 1;

Figure 3:
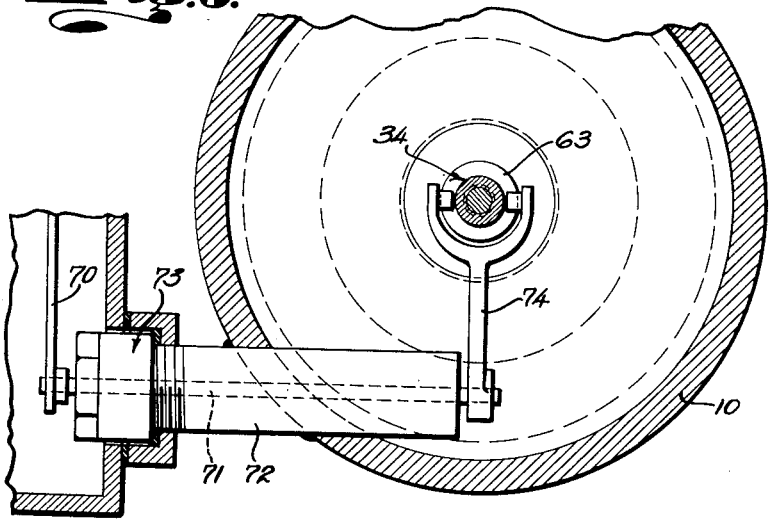
Fig. 3 is a view similar to Fig. 2 illustrating a modified form of bellows actuated take-off.

The assembly illustrated in Fig. 1 comprises preferably a unit housing 10 containing a pair of end chambers or spaces 11 and 12 closed at the outside by internally ribbed heads 13 and 14 threaded into the housing and carrying O-rings 15 which seal against fluid escape through the thread connections. Chambers 11 and 12 are subjected to differential fluid pressures as by diametrically aligned low pressure line connections 16 with chamber 11, and high pressure line connections 17 with chamber 12. The housing contains a pair of spaced transverse walls or partitions 18 defining an intermediate chamber 19 communicable through the partitions by way of openings 20 in axially aligned bushings 21 threaded into the partitions, the bushing flanges 22 carrying O-rings 23 in sealing engagement with the adjacent partition surfaces.

Chamber 12 contains a pressure responsive element generally indicated at 24, which as previously indicated has by reason of its flexibility and responsiveness, diaphragm characteristics, but which preferably comprises a circular corrugated bellows 25, the interior end of which is attached, and sealed to the extremity of the bushing flange as at 26. The outer portion of the bellows has a pair of heads 27 and 28, the latter being closed to hermetically seal the interior of the bellows assembly while the head 27 being attached at 281 to a corrugation adjacent the end corrugation to which the end 28 is attached, has openings 29 permitting fluid communication between the interior 30 of the bellows and space 31 between the heads. The purposes of the described dual bellows head arrangement, being among other things to compensate for expansion and contraction of the bellows-filling liquid due to temperature fluctuations are more particularly developed in my copending application Serial No. 528,409.

Chamber 11 similarly contains a bellows type diaphragm 32 carrying a closed head 33 so that the interior of the bellows, as in the case of bellows 25, is hermetically sealed against communication with the line fluid. Heads 27 and 33 of the bellows are rigidly interconnected by an attachment 34 comprising a section 35 carried by head 27, a tubular section 36 carried by head 33, the two sections being interconnected by screw 37, the head of which carries the seal ring 38 to prevent fluid leakage through any clearances in the threaded connection. Simultaneous displacement of the interconnected bellows in response to increasing pressures in chamber 12, is resisted by a coil spring 40 confined between washer 41 and a nut washer 42 on the threaded extent of pin 43. Washer 42 is adjustable along the pin to vary the spring tension, and is held in adjusted position by the threaded locking nut or sleeve 44. Pin 43 is carried by supporting bushing 45 retained within opening 46 in the head 13 by a lock ring 47, fluid leakage around the bushing being prevented by O-ring 48.

Chamber 19 as well as the bellows 25 and 32 and inter-communicating passages, are completely filled with a liquid, typically a light hydrocarbon or other non-aqueous liquid which may be selected for such properties as resistance to freezing, corrosion protection and lubricating qualities. To assure complete liquid filling of the bellows and intermediate chamber, these first may be exhausted of all air, as through an appropriate connection or sealable fitting conventionally indicated at 49, following which liquid is admitted through the fitting. As will be apparent, the liquid is permitted to completely fill the bellows, as well as the chamber, by reason of their communication through openings 20 about the bellows inter-connection 34. For reasons more fully discussed in my Patent No. 2,400,408, provision is made for positively arresting movements of the connection 34 in response to reciprocal displacements of the bellows, and for positively sealing the bellows interiors against liquid escape, as such pre-determined limits of the bellows displacement are reached. Thus section 35 is shown to carry a seal ring 50 serving as a valve which seats against the tapered bushing surface 51, section 36 similarly carrying a seal ring 52 which seats against the bushing surface 53.

The invention is particularly concerned with provision of means for transmitting motion or energy to an appropriate element or condition to be controlled exteriorally of the housing, in response to the bellows displacements and therefore in accordance with variations in the pressure differentials in lines 16 and 17. Figs. 1 and 2 show an illustrative take-off mechanism, generally indicated at 55, of the torque tube type. Here the housing 19 is intersected by a sealed tubular case 56 closed at one end by plug 57 and containing a relatively thick wall tube 58 which carries an arm 59 extending through the case opening 60, the tube being supported by and rotatable in the roller bearings 581. The inner end of the arm carries a yoke 61, projections 62 on which are engaged against a ring 63 held in fixed position on the bellows connection 34. The outer end of the tube 58 is rigidly connected by coupling 64 with a torsionally flexible tube 65 and also with a rod 66 extending through and beyond the end of the torsion tube. The outer end of the latter is rigidly received within a sealed bushing 67 which may be retained in any rotationally set position by a clamp nut 68. Plug 57 is removable to permit application of a driver to the end 58a of the rod in making and tightening the threaded connection at 591 between tube 58 and the arm 59.

The rod 66 may carry, actuate or control any type of element or condition to be governed in accordance with the pressure differential. As illustrated, the rod is shown to carry an arm 69 which may serve as the pointer or marker of a pressure indicating instrument, the casing of which is indicated at 70. The torque tube assembly is capable of presetting as to bring the indicator 69 to a zero or other reference position, in conformity with zero or predetermined pressure differential in the chambers 11 and 12. For this purpose lock nut 68 is released and a driver applied to the slotted head 67a of bushing 67 to rotate and preset the torque tube 65. With the element 69 thus brought to its zero or proper reference position, the lock nut may be tightened to retain bushing 67 and the tube in set position.

In Fig. 3 I show a variational form of mechanism for mechanically transmitting the bellows movement to the outside element 70. Here the latter is carried on a shaft 71 extending through its casing 72 into the housing 10, fluid escape along the shaft being prevented by an appropriate stuffing box indicated at 73. The inner end of the shaft carries a yoke arm 74 having the previously described association with ring 63 on the bellows connection 34. As will be understood, reciprocal movements of such connection impart corresponding oscillations to shaft 71.

Figure 4:
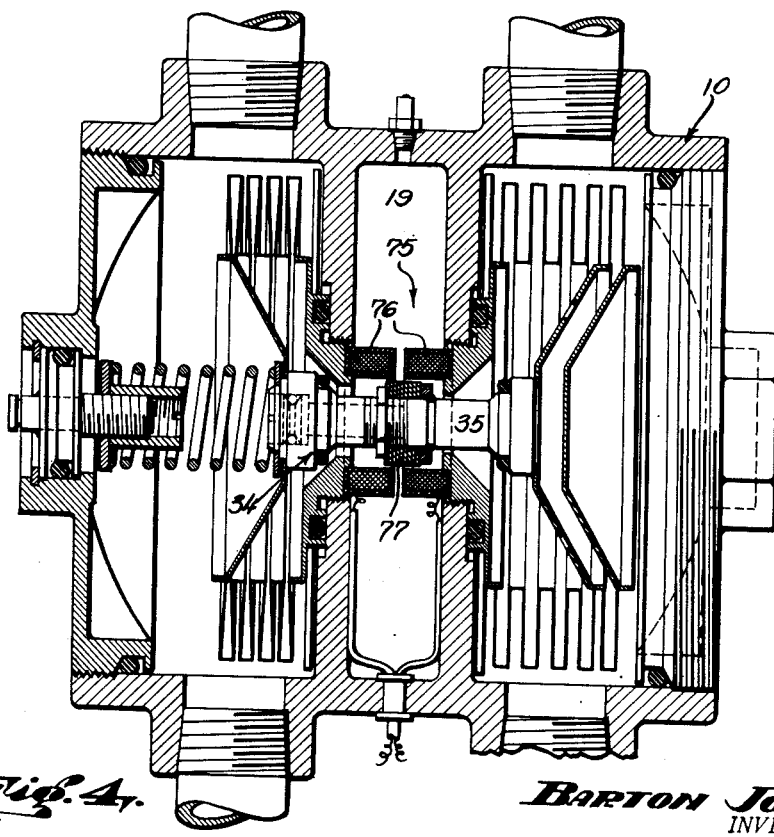
Fig. 4 is a view similar to Fig. 1 showing a variational form of the invention.

The general assembly illustrated in Fig. 4 is similar to the structures described with reference to Fig. 1, except that here operation of the element or thing outside the housing intended to respond to the pressure differential changes, is controlled by the transmission of electrical energy. Accordingly, I may accommodate within the chamber 19 any suitable type of form of electrical pick-up device, generally indicated at 75, which typically is shown to comprise a pair of stationary induction coils 76 between or within which is carried on the connection section 35 a core or armature 77, the effect of which is to vary the inductive characteristics of the coils 76 in accordance with movements of the element 77 relative thereto. As will be readily understood without necessity for specific illustration, the coils 76 may be connected in an appropriate bridge-type electrical circuit or instrument which accomplishes or effects the indication, measurement or control desired.

From the foregoing, it will be observed that in each instance the power or energy take-off device is hermetically sealed within the chamber 19 and exposed to or completely immersed in a liquid which protects the parts against oxidation and extraneous gases or liquids.

I claim:
1. In fluid pressure responsive apparatus of the type comprising a housing containing a pair of diaphragms movable in correspondence one with the other and exposed at adjacent sides to a common sealed body of liquid and at outer sides to differential pressures; the improvement comprising a twistable torque tube fixed at one end to the housing and extending within the housing with said liquid received thereabout, seal means preventing passage of said liquid from the outside of said tube into the interior thereof, means in the housing contacted by said liquid and mounting the tube for said twisting movement, a connection in the housing in contact with said liquid for transmitting movement of the diaphragms to said torque tube and thereby effecting twisting movement of the torque tube in correspondence with the diaphragm movements, said connection being so constructed that the resistance to twisting of said torque tube is transmitted by the connection to the diaphragms to resist the diaphragm movements, and an elongated member attached to and extending axially within said torque tube and transmitting twisting movements thereof to the outside of the housing.

2. Apparatus as recited in claim 1 in which said means mounting the torque tube comprise bearing means extending circularly about said tube and contacted by said liquid.

3. Apparatus as recited in claim 1 in which the diaphragms are movable along a first axis, and the longitudinal axis of said torque tube extends transversely of said first axis, said connection including a rigid member extending between and movable with said diaphragms, and a swinging arm attached at one end to said torque tube and actuated at its second end by said rigid member.

4. A fluid pressure responsive apparatus comprising a housing providing two chambers to which two fluid pressures may be conducted respectively, bellows in said chambers, each bellows being anchored at one end and movable at the other, means connecting the movable ends of the bellows to cause them to move in unison, means providing communication between the interiors of the bellows, valve means on the connecting means adapted to close off communication between the bellows when the movable ends of the bellows have been moved excessively, means for transmitting movements of the connecting means to the exterior of the housing, a spring in one of the chambers effective on the movable end of the bellows therein to urge said movable end toward the anchored end of said bellows, and means accessible from the exterior of the housing for adjusting the effectiveness of the spring on said movable end of the bellows.

BARTON JONES.

References Cited in the file of this patent

UNITED STATES PATENTS

| Number | Name | Date |
|---|---|---|
| 897,730 | Fulton | Sept. 1, 1908 |
| 1,459,218 | Knaak | June 19, 1923 |
| 1,877,810 | Chamberlain | Sept. 20, 1932 |
| 1,990,264 | Benson | Feb. 5, 1935 |
| 2,146,204 | Dore | Feb. 7, 1939 |
| 2,276,580 | Hofer | Mar. 17, 1942 |
| 2,365,573 | McGay | Dec. 19, 1944 |
| 2,381,429 | Bell | Aug. 7, 1945 |
| 2,400,048 | Jones | May 7, 1946 |
| 2,497,255 | Brown | Feb. 14, 1950 |
| 2,564,221 | Hornfeck | Aug. 14, 1951 |
| 2,627,750 | Titus | Feb. 10, 1953 |

FOREIGN PATENTS

| Number | Country | Date |
|---|---|---|
| 325,651 | Great Britain | 1930 |
| 829,790 | France | 1938 |